United States Patent
Scholl et al.

(10) Patent No.: US 10,639,569 B2
(45) Date of Patent: May 5, 2020

(54) FILTER DEVICE HAVING A PUMP

(71) Applicant: HYDAC FLUIDCARECENTER GMBH, Sulzbach/Saar (DE)

(72) Inventors: Thomas Scholl, Saarlouis (DE); Micha Kreibig, Merzig-Brotdorf (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 114 days.

(21) Appl. No.: 15/758,014

(22) PCT Filed: Sep. 22, 2016

(86) PCT No.: PCT/EP2016/001586
§ 371 (c)(1),
(2) Date: Mar. 7, 2018

(87) PCT Pub. No.: WO2017/050432
PCT Pub. Date: Mar. 30, 2017

(65) Prior Publication Data
US 2018/0243670 A1    Aug. 30, 2018

(30) Foreign Application Priority Data

Sep. 25, 2015    (DE) .................. 10 2015 012 556

(51) Int. Cl.
*B01D 35/26* (2006.01)
*F02M 37/44* (2019.01)
(Continued)

(52) U.S. Cl.
CPC ............. *B01D 35/26* (2013.01); *B01D 35/00* (2013.01); *B01D 35/005* (2013.01);
(Continued)

(58) Field of Classification Search
CPC ........ B01D 2201/291; B01D 2201/347; B01D 35/00; B01D 35/005; B01D 35/147;
(Continued)

(56) References Cited

U.S. PATENT DOCUMENTS

| 5,106,500 A * | 4/1992 | Hembree ............. B01D 29/117 210/266 |
| 6,019,890 A | 2/2000 | Janik et al. |
| 8,394,268 B2 * | 3/2013 | O'Brien .................. C02F 1/002 210/200 |

FOREIGN PATENT DOCUMENTS

| DE | 10 2008 062 552 | 6/2010 |
| DE | 10 2009 008 676 | 8/2010 |

(Continued)

OTHER PUBLICATIONS

International Search Report (ISR) dated Dec. 1, 2016 in International (PCT) Application No. PCT/EP2016/001586.

*Primary Examiner* — Terry K Cecil
(74) *Attorney, Agent, or Firm* — Wenderoth, Lind & Ponack, L.L.P.

(57) ABSTRACT

A filter device usable with diesel fuels, includes a filter element (19) exchangeably accommodated in a filter housing. A fluid pump device (46) having two pump chambers (45, 49) is part of the filter device. The pump chambers, by a pump piston (51) guided in the chambers in a longitudinally movable manner, are separated from each other fluid-tight at least in one of the two directions of movement of the pump piston. Each pump chamber (45, 49) is assigned a valve (39, 63) opening or closing oppositely to the other valve (39, 63) when the pump device (46) is actuated.

18 Claims, 6 Drawing Sheets

(51) Int. Cl.
  *B01D 36/00* (2006.01)
  *F02M 37/16* (2006.01)
  *F02M 37/22* (2019.01)
  *B01D 35/147* (2006.01)
  *B01D 35/00* (2006.01)
  *B01D 35/157* (2006.01)

(52) U.S. Cl.
  CPC ....... *B01D 35/147* (2013.01); *B01D 35/1573* (2013.01); *B01D 36/001* (2013.01); *B01D 36/003* (2013.01); *F02M 37/16* (2013.01); *F02M 37/22* (2013.01); *F02M 37/44* (2019.01); *B01D 2201/291* (2013.01); *B01D 2201/347* (2013.01)

(58) Field of Classification Search
  CPC .. B01D 35/1573; B01D 35/26; B01D 36/001; B01D 36/003; F02M 37/16; F02M 37/22; F02M 37/44
  See application file for complete search history.

(56) References Cited

FOREIGN PATENT DOCUMENTS

| | | | |
|---|---|---|---|
| DE | 10 2009 040 655 | 3/2011 | |
| DE | 10 2010 016 480 | 10/2011 | |
| DE | 10 2011 076 413 | 11/2012 | |
| DE | 10 2012 216 385 | 3/2014 | |
| EP | 0 890 385 | 1/1999 | |
| GB | 875340 A * | 8/1961 | ........... B01D 29/114 |
| GB | 1 157 187 | 7/1969 | |
| GB | 2 114 237 | 8/1983 | |

* cited by examiner

FILTER DEVICE HAVING A PUMP

FIELD OF THE INVENTION

The invention relates to a filter device, in particular provided for use with diesel fuels. A filter element that can be exchangeably accommodated in a filter housing. Further, the invention relates to a supply system for an internal combustion engine.

BACKGROUND OF THE INVENTION

In systems for supplying consumers or recipients with fluids, such as liquid fuels for the operation of internal combustion engines, the state of the art (e.g., DE 10 2009 008 676 A1) involves connecting filter devices upstream of the associated feed pumps, in order to withhold pollutants endangering the operational reliability. For supply systems for diesel engines, ordinarily a filter device is connected upstream of a pre-feed pump in the intake line for diesel fuel, which filter device acts as a pre-filter to remove the main pollution load, including water, from the fuel supplied to the tank, before the pre-feed pump continues supplying the fuel via a fine mesh filter to the injection pump, which is part of the injector system, for example in the form of a common rail system. In the operation of these systems the filter element of the filter device, as a pre-filter cleans the brunt of the pollutants, is to be replaced after the appropriate operating time. For these operations taking place with an at least partially emptied filter housing, air is introduced into the system, which air must be removed in order to ensure the delivery operation of the pre-feed pump. To this end, in the state of the art hand pumps are used, with which the air can be extracted and which can be connected in conjunction with associated valve devices from the outside on the relevant filter housing. The maintenance work that must be carried out for a filter element replacement is therefore laborious and time-consuming.

SUMMARY OF THE INVENTION

With regard to this problem, the invention basically addresses the problem of providing an improved filter of the type in question, which is characterized by a particular ease of maintenance.

In accordance with the invention, this problem is solved by a filter device having a fluid pump device with two pump chambers as part of the filter device. A pump piston is guided longitudinally movably in these pump chambers and separates these chambers from one another in a fluid tight manner, at least in one of the pump piston's two directions of travel. Each pump chamber is assigned a valve. Each valve works in opposite direction to the other valve upon actuation of the pump device for opening or closing. The entire device required for extracting the introduced air, including the pump devices and the assigned valves, is integrated in the inventive filter device. Due to the fact that no external devices have to be used and no work is required for the connection of the devices, the maintenance work associated with a replacement of the filter element can be carried out quickly and safely, and thus, cost-effectively.

The pump device is a permanent part of the filter device. A part is arranged in the filter housing with the filter element to be replaced. In particular, the pump piston is be operated preferably by hand, divides the two pump chambers, and is arranged on the cover side or the head side of the filter housing.

For particularly advantageous embodiments, at least the one valve is part of the filter element and in its opened position transfers fluid to its assigned pump chamber from the filter element, while it blocks this route in its closed position. In a filter element replacement with an associated entry of air into the filter housing, air is in the process transferred to the pump chamber via this opened valve during activity of the pump device.

With particular advantage, the other or second valve can be part of the filter housing, in particular of its housing head. The housing head can be bolted back onto a housing pot in detachable manner with the accommodating filter element. In its opened position this second valve transfers fluid to its assigned pump chamber, and in its closed position it blocks this route. On the other hand, as was the case with the first valve, during the activity of the pump device, air that is introduced into the housing in the event of a filter element replacement is transferred together with the fuel present in the housing to the assigned pump chamber. Alternatively, both valves can also be part of the filter element or of the filter housing.

With particular advantage, the arrangement can be made such that the pump piston is connected to a rod-shaped actuation device. This activation device can extend out of the filter housing by a handle enabling the movement of the pump piston by hand in its two pump chambers. As a result, the extraction of air from the filter housing is especially easy and convenient. The pump chamber of the filter element that can be connected to the clean side of the filter by the first valve can have a fluid connection for further transport of the fluid to a pre-feed pump, preferably a diesel injection system. As a result, the pump device forms a feed device connected further upstream of the pre-feed pump, which through its operation extracts air out of the filter housing and after the air removal, feeds suctioned fuel to the pre-feed pump and in the course of pump actuation fills it with fuel. A secure start of the pre-feed pump, and the secure restart of the total supply system is then ensured.

In the process, the arrangement can be advantageously made such that, in passing through the pump chamber that receives the fluid from the second valve in its open position, in the direction of its decreasing chamber volume, fluid from this chamber is displaced via the pump piston in the direction of the other pump chamber. As a result, the pump chamber, from which, during a forward stroke the fluid is displaced to the pre-feed pump, can be refilled during a return stroke of the pump piston for the next forward or delivery stroke.

For this filling function the pump piston can have an elastically flexible edge along its outer periphery. In the one direction of travel of the pump piston, fluid flow from the one pump chamber to the other chamber and in the other direction of travel is permitted during a delivery or forward stroke, the fluid flow is blocked in this route.

In advantageous exemplary embodiments the valve of the filter element has a valve ball. The valve ball is guided in a cage with fluid passages and is part of an end cap of the filter element facing the assignable pump chamber.

In such a way, this valve can be realized as a check valve in a simple design.

Advantageously, the second valve can be formed from a spring loaded check valve, whose intake duct is connected to the clean side of the filter element. The spring loading is, in this connection, set such that this second valve opens automatically for inflowing fluid when the pump piston moves in the direction increasing the volume of the connected pump chamber.

The subject matter of the invention is also a supply system for an internal combustion engine, having a filter device according to the invention. Such a supply system can be used with particular advantage for the supply of diesel engines and, in particular, is also suitable for large stationary diesel engines.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
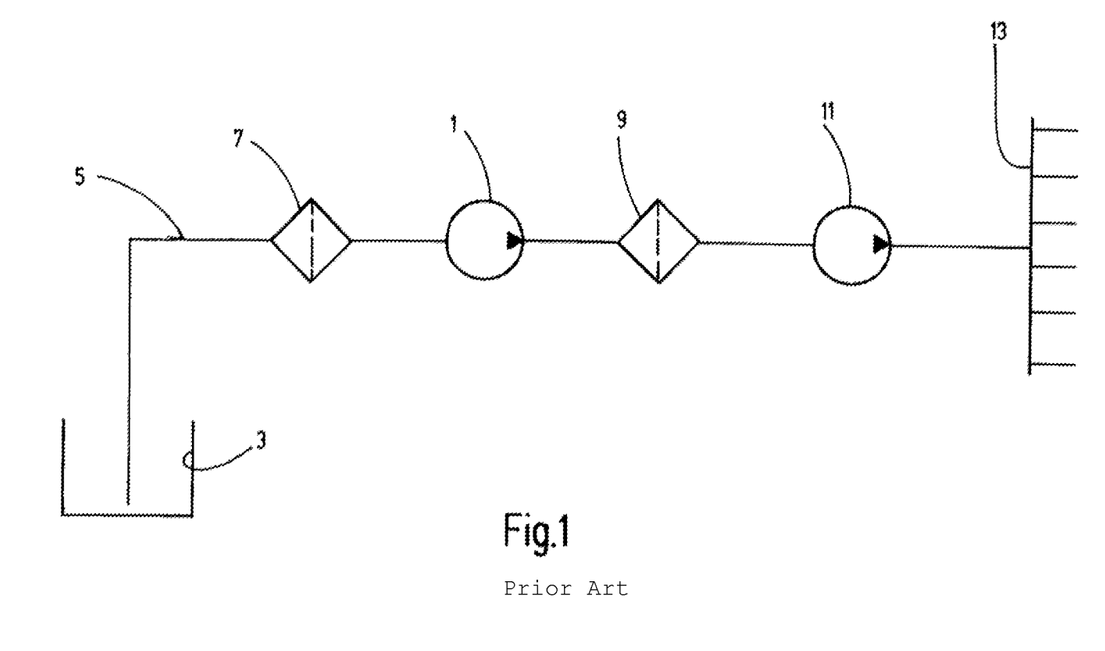
FIG. 1 is a schematic diagram or flow chart of the fluid circuit of a fuel supply system according to the prior art.

FIG. 1 shows a conventional supply system for supplying fuel to an internal combustion engine. A pre-feed pump 1 extracts fuel from a fuel tank 3 via an intake line 5. A pre-filter 7 in intake line 5 is connected upstream of the pre-feed pump 1. From the pre-feed pump 1 the fuel goes through a fine mesh filter 9 connected upstream of a fuel pump 11. Pump 11 supplies an injector system 13 for a diesel engine, for example, in the form of a common rail system.

In such systems, at least for the pre-filter 7, a filter element replacement must be performed after the expiration of the appropriate operating time, which replacement can result in the entry of a considerable quantity of air into the system. To continue operation after the filter replacement, ventilation measures are required to remove the incoming air, which would impede or prevent the feed function of the pre-feed pump, from the system for the continued operation of the system. As already mentioned, to this end ordinarily extraction devices are connected on the pre-filter 7 (not shown in the figure) and put into operation.

Figure 4:
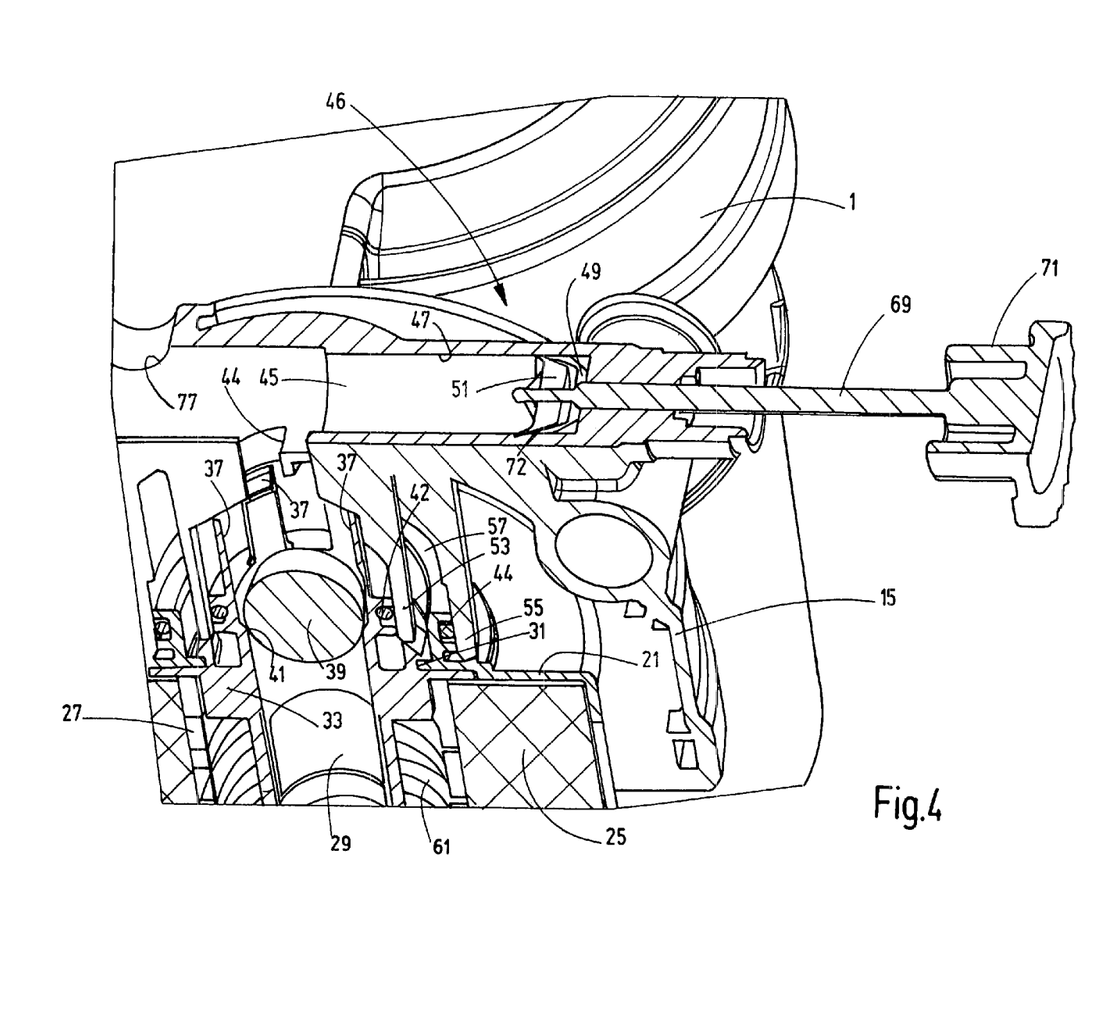
FIG. 4 is a partial perspective view partially in horizontal and vertical section of the housing head of the filter housing of the exemplary embodiment with a drawn back pump piston of the pump device.
Figure 5:
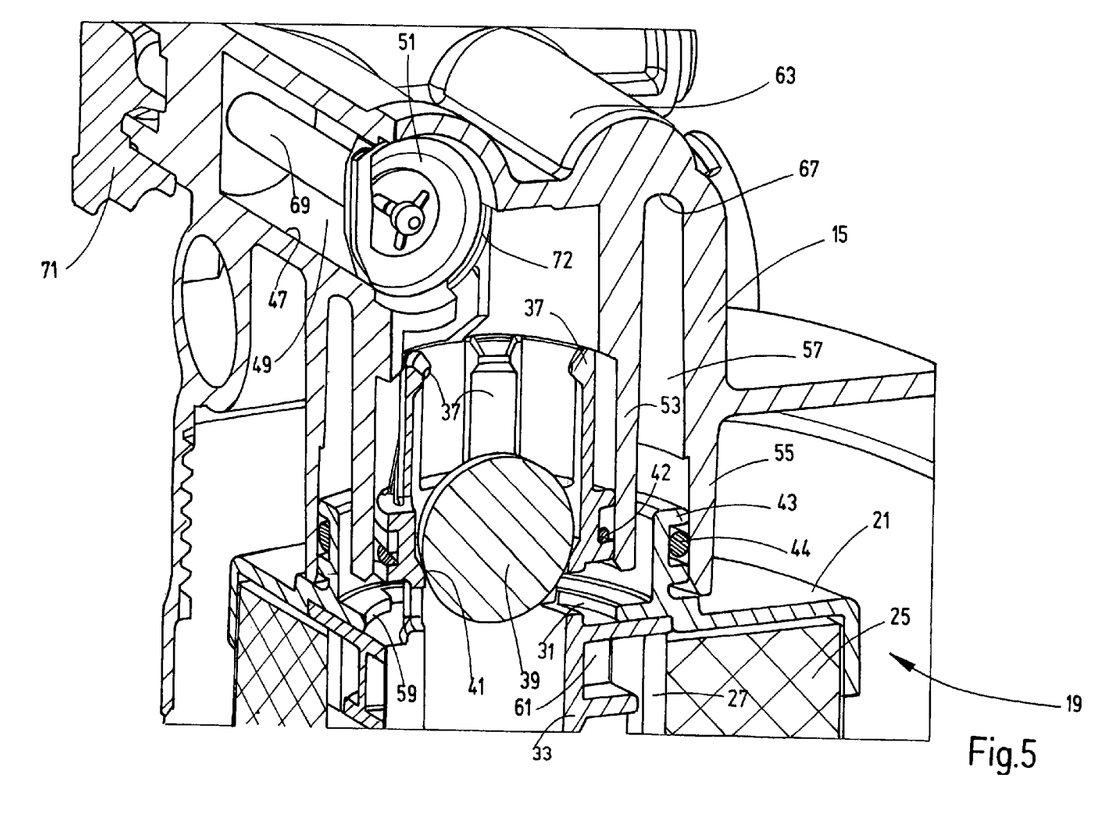
FIG. 5 is a partial perspective view in section of the housing head with a retracted pump piston of the pump device of the exemplary embodiment.
Figure 6:
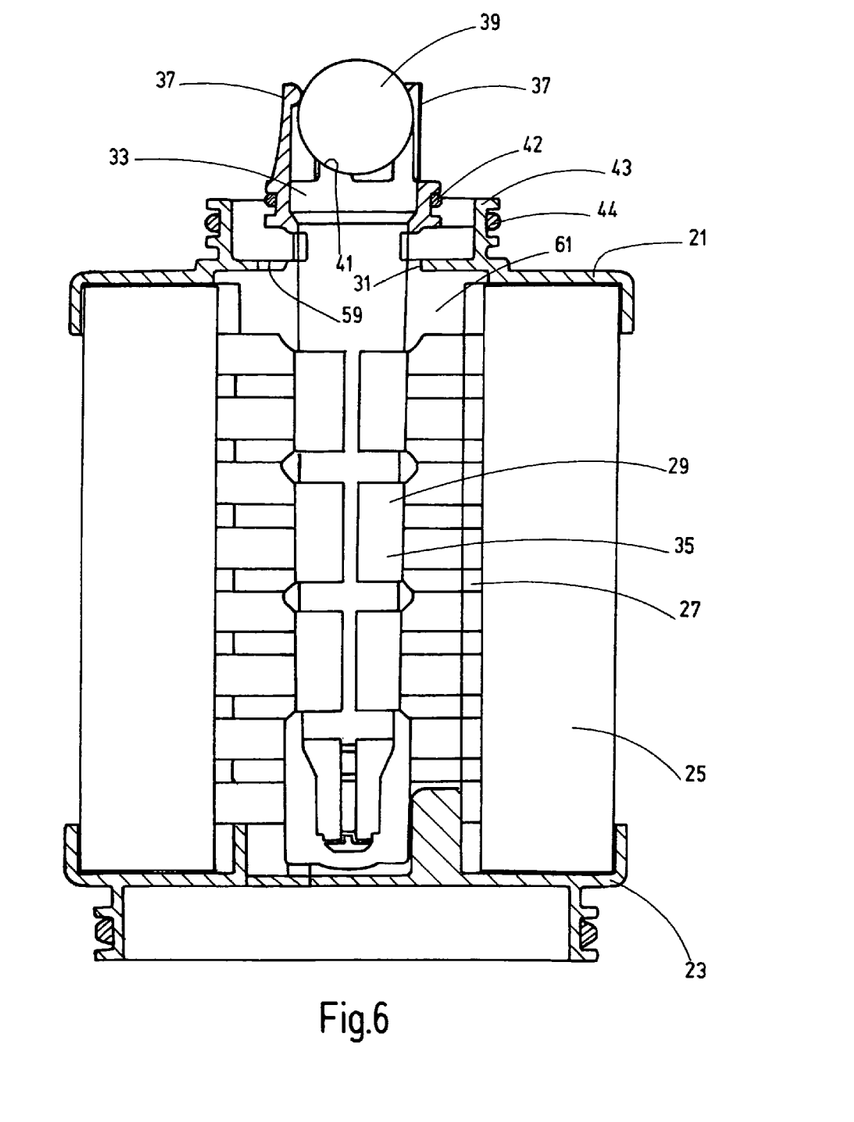
FIG. 6 is a side view in section of the separately displayed filter element of the exemplary embodiment.

In the case of the inventive device, of which an exemplary embodiment is presented in FIGS. 2 through 6, an extraction or filter for the prefilter 7 of the supply system of FIG. 1 device is integrated in the housing head 15, which, as a fluid-tight seal, can be screwed onto a filter pot not shown in the figures. The filter pot is configured in the usual design for such filter devices and accommodates a filter element 19, which is shown separately in FIG. 6 and which can be removed for replacement after unscrewing the housing head 15 from the housing pot 16. The filter element 19 has, in the usual manner, a filter medium 25 between the upper end cap 21 and the lower end cap 23. The filter medium 25, in the exemplary embodiment is in the form of a mesh pack forming a hollow cylinder, and serves as a coalescer device. The coalescer promotes the formation of drops in the water contents in the diesel oil. The drops descend in the inner cavity 29 forming a sump on the open lower end cap 23, which water contents can be conveyed from lower end cap 23 to the outside. A fluid-permeable support tube 27 is in contact with the inside of the filter medium 25 and surrounds the inner filter cavity 29, which forms the clean side in operation during the through fluid flow occurring from the outside of the filter medium 25 to the inside. In the central opening 31 of the upper end cap 21, a hollow retaining body 33 is located for a water repellent (hydrophobic) barrier layer 35 (FIG. 6). In particular, a descent occurs from the element 19 to the water accumulator of the housing pot 16.

The hollow retaining body 33 fixed on the upper end cap 21 forms an outlet from the inner cavity 29 forming the clean side and has a collar of fingers 37 protruding upward, which fingers 37 form a kind of cage for a valve ball 39. In addition, a valve seat 41 is formed for the valve ball 39 in the passage of the retaining body 33. At the transition to the retaining fingers 37, at about the height of the valve seat 41, an O-ring 42 is located at the outside of the retaining body 33. At a radial distance to O-ring 42 on the upper end cap 21, an annular, upward protruding extension 43 accommodates a further O-ring 44.

Figure 2:
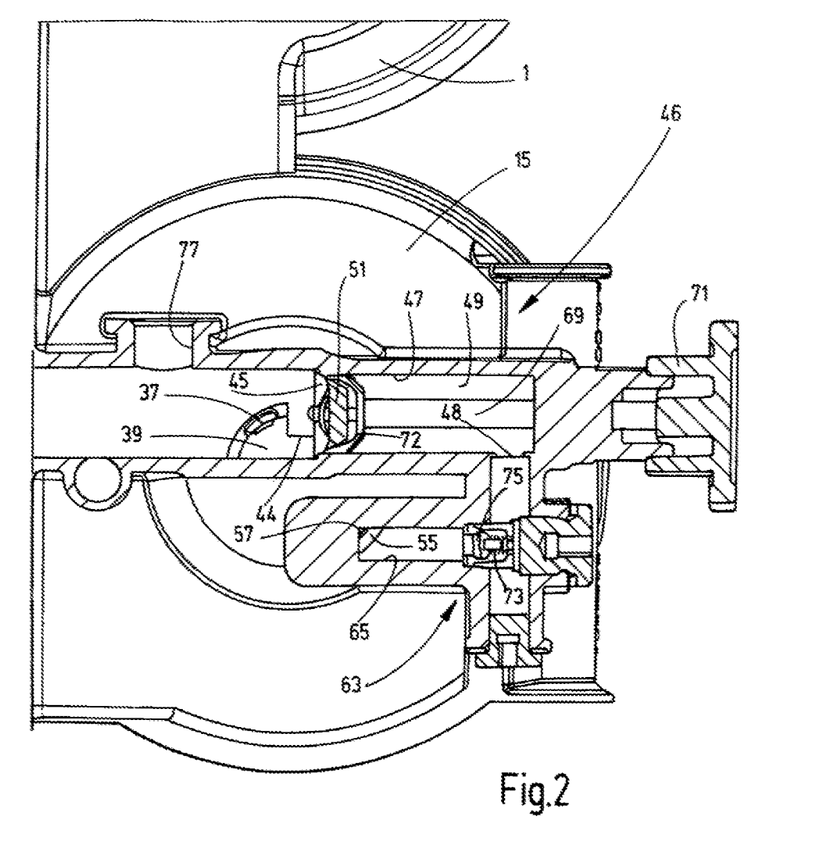
FIG. 2 is a top plan view partially in a horizontal section, of a filter device according to an exemplary embodiment of the invention.

FIGS. 2, 4 and 5 show the check valve formed by the valve ball 39 and the valve seat 41, designated as the first valve here, in each case in the closed position. In that closed position, the fluid connection between the inner filter cavity 29 on the clean side and an inlet 44 is blocked at a first pump chamber 45 of a pump device or pump 46. The pump device has an inlet 48 to a second pump chamber 49 on its pump cylinder 47. The pump cylinder 47 with pump piston 51 traveling and extending between the pump chambers 45 and 49 is arranged above the filter element 19 with a horizontal cylinder axis in the housing head 15.

Figure 3:
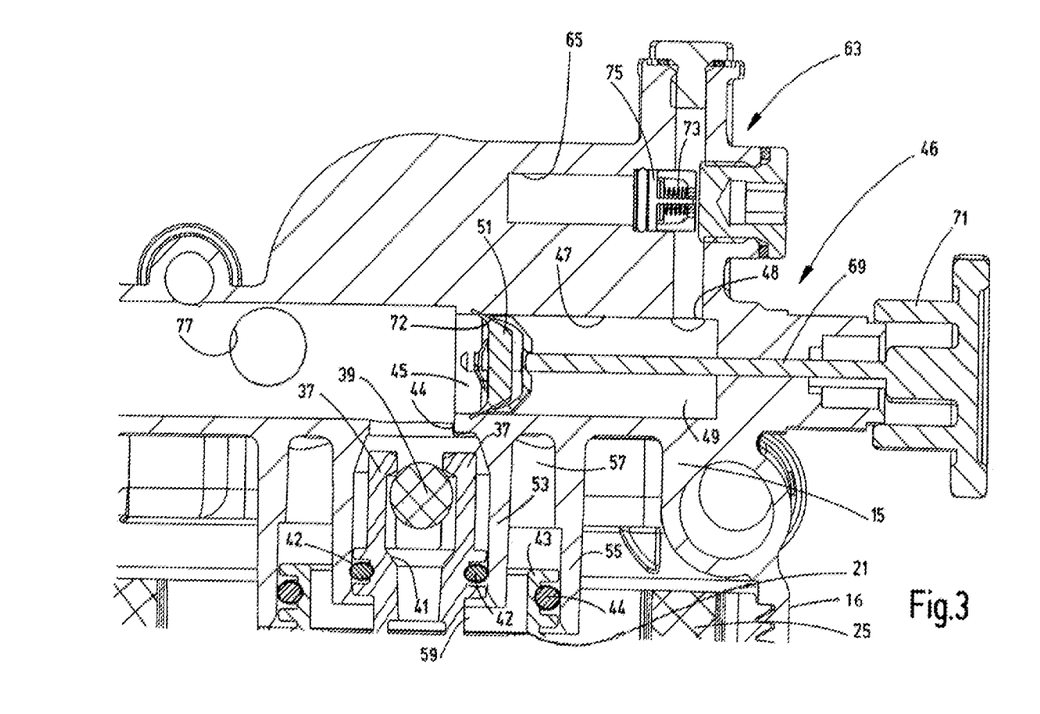
FIG. 3 is a partial side view in section of the housing head of the filter housing of the exemplary embodiment in larger scale.

The housing head 15 has two hollow cylinders 53 and 55 coaxial to the longitudinal axis of the filter element 19 and concentric to one another, which cylinders are open on the side facing the end cap 21 of the filter element 19 as a holding fixture for the filter element 19 and for the formation of fluid connections. The inner hollow cylinder 53 is surrounded by the outer hollow cylinder 55 at a radial distance. If the filter element 19 is inserted in its functional position, the O-ring 42 forms the seal of a fluid connection between the retaining body 33 and the inside wall of the inner hollow cylinder 53. For an opened valve ball 39 raised from the valve seat 41, as shown in FIG. 3, fluid communication leads from the inside of the sieve pipe 35 to the inlet 44 of the first pump chamber 45. The radial O-ring 44 lying further outward forms the seal between the extension 43 of the end cap 21 and the inside of the outer hollow cylinder 55. As a result, a second sealed fluid connection is formed between the annular space 57 between the inner hollow cylinder 53 and the outer hollow cylinder 55 via an outlet 59 of the end cap 21 to the clean side space 61 between the support tube 27 and the sieve pipe 35. FIGS. 2 and 3 show that in the housing head 15, a second valve 63 is arranged above the pump cylinder 47 such that its inlet 65 overlaps the upper end 67 of the clean side annular space 57, so that, see FIG. 2, a fluid connection is formed from the clean side to the inlet 65 of the second valve 63.

The pump piston 51 can be operated manually by a handle 71 mounted on its piston rod or actuator 69 in the pump cylinder 47 between the first pump chamber 45 and the second pump chamber 49. The pump piston 51 has an elastically flexible edge 72 on the piston circumference. Flexible edge 72 is in the manner of a membrane in moving into the position shown in FIGS. 2, 3 and 5, when the volume of the first pump chamber 45 is reduced and the volume of the second pump chamber 49 is increased, and forms a fluid-tight seal on the inside wall of the pump cylinder 47. When retracted to the position shown in FIG. 4, flexible edge 72 permits the overflowing of the pump piston 51, so that fluid present in the second pump chamber 49 reaches the first pump chamber 45 when the second pump chamber volume is reduced. The second valve 63 is a check valve with valve bodies 75 loaded by a compression spring 73, which opens for the passage of fluid from the inlet 65 to the second pump chamber 49 via its inlet 48 when actuated by pressure.

For the operation of the pump device 46 during the retraction of the pump piston 51 from the position shown in FIGS. 2, 3 and 5 to the position shown in FIG. 4, the volume of the first pump chamber 45 is increased, and the first valve opens by raising the valve ball 39, see FIG. 3, where the start of the return travel is shown. In the process, fluid, i.e., air and remaining fuel, flows from the filter element 19 via the inlet 44. Simultaneously, fluid present in the second pump chamber 49 due to the overflow of the pump piston 51 reaches the first pump chamber 45, because during the return travel the second valve 63 is closed. During a subsequent insertion of the piston 51 from the position shown in FIG. 4, the valve ball 39 of the first valve closes, and the total fluid collected in the first pump chamber 45 is conducted via an outlet 77 to the pre-feed pump 1. Simultaneously, during this piston motion, the second valve 63 opens, so that fluid flows via its inlet 65 over the space 57 from the clean side. During repeated operating cycles with further actuation of the pump device 46 air will be removed from the filter housing. If necessary, any present inflowing fuel will be transported to the downstream pre-feed pump 1, ensuring a secure function after replacement of a filter element.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing;
a filter element exchangeably accommodated in said filter housing;
a fluid pump being in said filter housing and having first and second pump chambers;
a pump piston being movably guided longitudinally in said first and second pump chambers in two directions of travel and separating said first and second pump chambers from one another in a fluid tight manner when stationary and in at least one of the two directions; and
first and second valves being connected in fluid communication with said first and second pump chambers, respectively, and oppositely opening and closing upon actuation of said fluid pump, said first valve being in and part of said filter element and being movable between an open position providing fluid communication with and transfer of fluid to said first pump chamber from said filter element and a closed position blocking fluid communication with and transfer of fluid to said first pump chamber from said filter element.

2. A filter device according to claim 1 wherein said second valve is in and part of said filter housing and is movable between an open position providing fluid communication with and transfer of fluid from said second pump chamber and a closed position blocking fluid communication with and transfer of fluid from said second pump chamber.

3. A filter device according to claim 2 wherein said filter housing comprises a housing head detachably coupled on a filter pot, said filter pot accommodating said filter element, said second valve being in said filter head.

4. A filter device according to claim 2 wherein said second pump chamber receives fluid from said second valve in the open position thereof, fluid in said second chamber being displaceable via said pump piston into said first pump chamber in movement of said pump piston in a direction into said second pump chamber.

5. A filter device according to claim 1 wherein said pump piston is connected to a rod-shaped actuator extending out of said filter housing, said rod-shaped actuator being connected to a handle outside of said filter housing and enabling manual movement of said pump piston in said pump chambers.

6. A filter device according to claim 1 wherein said first pump chamber is connected in fluid communication to a clean side of said filter element by said first valve in the open position thereof without passing through the filter element, and is connected in fluid communication to a fluid connection connected to a diesel injection pre-feed pump.

7. A filter device according to claim 1 wherein said pump piston comprises a flexible edge along a radial outer periphery of said pump piston blocking flow of fluid between said first and second pump chambers in movement of said pump piston in first direction and permitting the flow of fluid between said first and second pump chambers in the movement of the pump piston in second direction opposite the first direction.

8. A filter device according to claim 1 wherein said first valve comprises a valve ball movably guided in a cage with passages, said valve ball and said cage being part of an end cap of said filter element, said end cap being on an end of said filter element facing said first pump chamber.

9. A filter device according to claim 1 wherein said second valve comprises a spring loaded check valve with an intake duct connected in fluid communication to a clean side of said filter element without passing said filter element.

10. A fuel supply system, comprising:
a fluid circuit with an upstream pre-feed pump and a downstream main feed pump; and
a filter device in said fluid circuit upstream of said pre-feed pump, said filter device including
a filter housing;
a filter element exchangeably accommodated in said filter housing;
a fluid pump being in said filter housing and having first and second pump chambers;
a pump piston being movably guided longitudinally in said first and second pump chambers in two directions of travel and separating said first and second pump chambers from one another in a fluid tight manner when stationary and in at least one of the two directions; and first and second valves being connected in fluid communication with said first and second pump chambers, respectively, and oppositely opening and closing upon actuation of said fluid pump, said first valve being in and part of said filter element and being movable between an open position providing fluid communication with and transfer of fluid to said first pump chamber from said filter element and a closed position blocking fluid communication with an transfer of fluid to said first pump chamber from said filter element.

11. A fuel supply system device according to claim 10 wherein
said second valve is in and part of said filter housing and is movable between an open position providing fluid communication with and transfer of fluid from said second pump chamber and a closed position blocking fluid communication with and transfer of fluid from said second pump chamber.

12. A fuel supply system according to claim 11 wherein said filter housing comprises a housing head detachably coupled on a filter pot, said filter pot accommodating said filter element, said second valve being in said filter head.

13. A fuel supply system according to claim 11 wherein said second pump chamber receives fluid from said second valve in the open position thereof, fluid in said second chamber being displaceable via said pump piston into said first pump chamber in movement of said pump piston in a direction into said second pump chamber.

14. A fuel supply system according to claim 10 wherein said pump piston is connected to a rod-shaped actuator extending out of said filter housing, said rod-shaped actuator being connected to a handle outside of said filter housing and enabling manual movement of said pump piston in said pump chambers.

15. A fuel supply system according to claim 10 wherein said first pump chamber is connected in fluid communication to a clean side of said filter element by said first valve in the open position thereof without passing through the filter element.

16. A fuel supply system according to claim 10 wherein said pump piston comprises a flexible edge along a radial outer periphery of said pump piston blocking flow of fluid between said first and second pump chambers in movement of said pump piston in first direction and permitting the flow of fluid between said first and second pump chambers in the movement of the pump piston in second direction opposite the first direction.

17. A fuel supply system according to claim 10 wherein said first valve comprises a valve ball movably guided in a cage with passages, said valve ball and said cage being part of an end cap of said filter element, said end cap being on an end of said filter element facing said first pump chamber.

18. A fuel supply system according to claim 10 wherein said second valve comprises a spring loaded check valve with an intake duct connected in fluid communication to a clean side of said filter element without passing said filter element.

* * * * *